United States Patent [19]

Mount

[11] 4,072,066
[45] Feb. 7, 1978

[54] CENTRIFUGAL FORCE CONTROLLED TRANSMISSION

[76] Inventor: Donald L. Mount, Rte. 1 - Box 188, Memphis, Mo. 63555

[21] Appl. No.: 698,701

[22] Filed: June 22, 1976

[51] Int. Cl.² ............................................. F16H 3/74
[52] U.S. Cl. .................................................. 74/752 F
[58] Field of Search ................. 74/750 R, 751, 752 F, 74/793, 660

[56] References Cited

U.S. PATENT DOCUMENTS

| | | | |
|---|---|---|---|
| 2,052,507 | 8/1936 | Walton | 74/751 |
| 2,183,460 | 12/1939 | Lenox | 74/751 |
| 2,877,667 | 3/1959 | Ploger | 74/751 |

*Primary Examiner*—Stephen C. Bentley
*Attorney, Agent, or Firm*—Clarence A. O'Brien; Harvey B. Jacobson

[57] ABSTRACT

The drive ratio of a planetary gear transmission is controlled by the centrifugal force associated with a rotor assembly having an imbalance that varies as a function of the speed of oppositely rotating eccentric rotor elements relative to a carrier frame mounting planetary gears drivingly connected to a spider on which the rotor assembly is mounted. Reaction gears fixed to the carrier frame control the rotational and phase relationships of the rotor elements on the rotor assembly.

11 Claims, 6 Drawing Figures

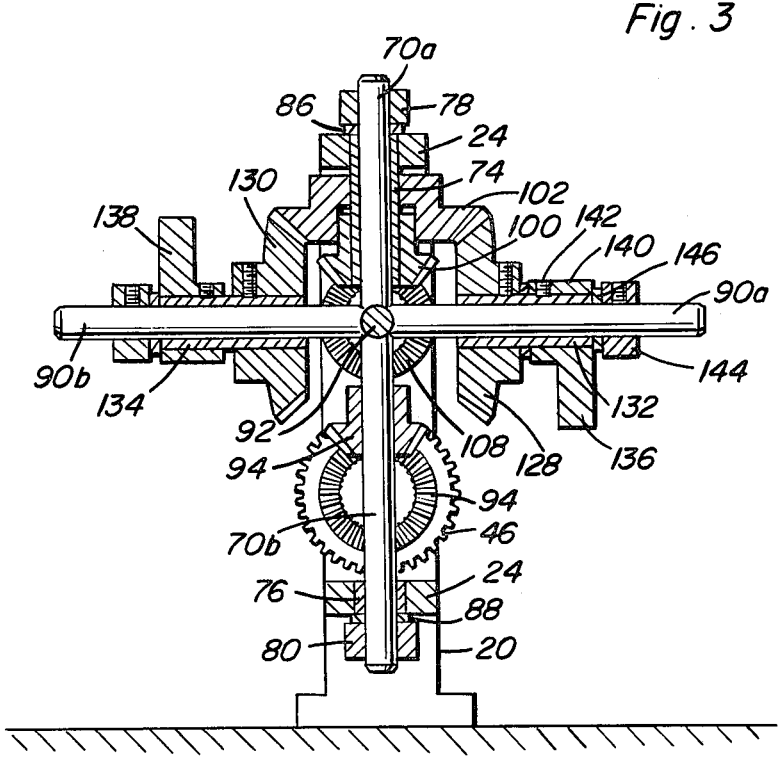

CENTRIFUGAL FORCE CONTROLLED TRANSMISSION

BACKGROUND OF THE INVENTION

This invention relates to a planetary gear transmission having a drive ratio that varies as a function of input speed and torque loading.

Planetary gear transmissions wherein a drive ratio is established by restraints centrifugally imposed on the planet gears through eccentric weights, are well known. The amount of torque capable of being transmitted by such transmissions is however, limited while the drive ratio variation is often less than desirable. It is therefore an important object of the present invention to provide a transmission of the foregoing type having inherently more positive drive ratio control and greater design flexibility in so far as meeting various drive ratio variation requirements.

SUMMARY OF THE INVENTION

In accordance with the present invention, a planet gear carrier frame connected to an output shaft is rotatable relative to an input gear about a common fixed axis intersected by at least three axes about which eccentric rotor elements are rotated to vary the eccentric loading imposed on the planet gears. The intersecting rotor axes are established by a spider assembly rotatably mounted in the carrier frame and driven by the planet gears. Reaction gears fixed to the carrier frame control rotation of the rotor elements relative to the carrier frame about the intersecting rotor, spider and carrier axes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 3 is a transverse section view taken substantially through a plane indicated by section line 3—3 in FIG. 2.

FIG. 4 is a schematic representation of another embodiment of a transmission constructed in accordance with the present invention.

FIG. 5 is a perspective view of a spider assembly utilized in the transmission of FIGS. 1, 2 and 3.

FIG. 6 is a perspective view of a spider assembly utilized in the transmission of FIG. 4.

DETAILED DESCRIPTION OF THE PREFERRED EMBODIMENTS

Figure 1:
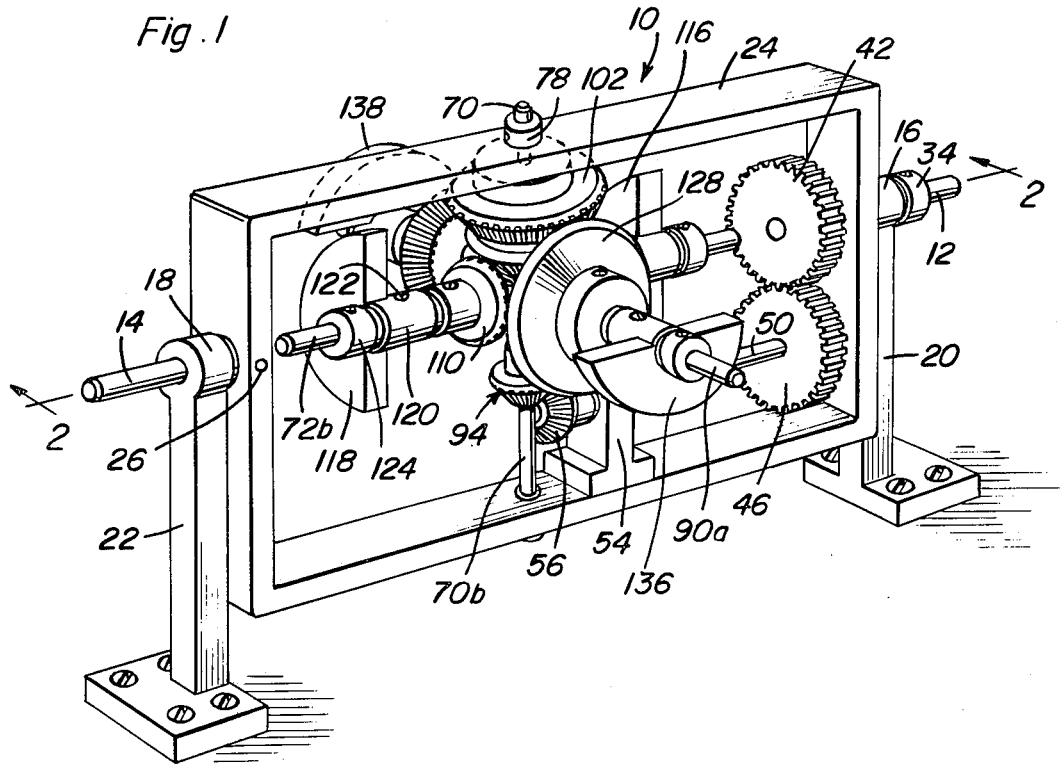
FIG. 1 is a perspective view of one embodiment of a transmission constructed in accordance with the present invention.
Figure 2:
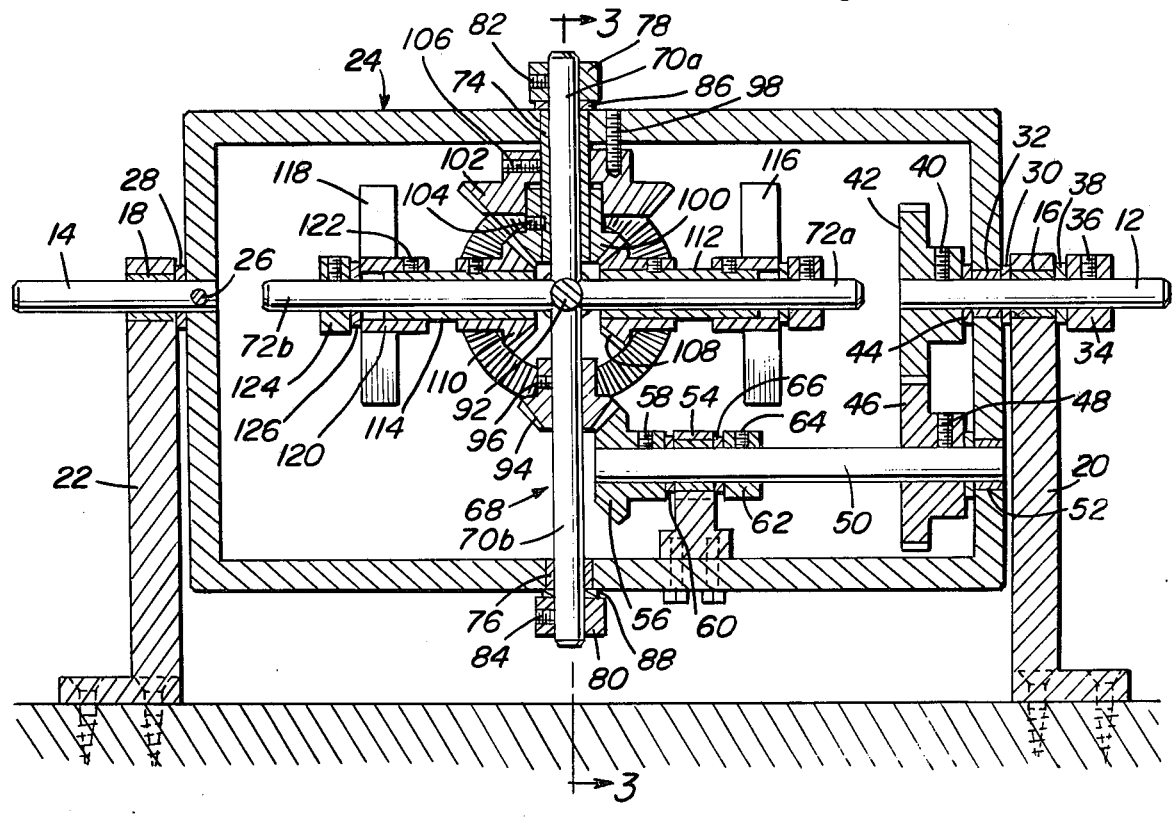
FIG. 2 is a side sectional view taken substantially through a plane indicated by section line 2—2 in FIG. 1.

Referring now to the drawings in detail, FIGS. 1, 2 and 3 disclose one form of a variable speed transmission constructed in accordance with the present invention and generally denoted by reference numeral 10. The transmission includes an input shaft 12 driven by some prime mover such as a combustion engine and an output shaft 14 adapted to be connected to some mechanical load. The input and output shafts are mounted for rotation about a common rotational carrier axis relative to a reference frame by spaced bearings 16 and 18 shown secured to the frame by standards 20 and 22. A carrier frame 24 of generally rectangular shape is secured at one longitudinal end to the output shaft by means of a screw fastener 26, for example. A thrust washer 28 spaces the carrier frame from bearing 18, the carrier frame being spaced from the bearing 16 at its other longitudinal end by a thrust washer 30 as more clearly seen in FIG. 2. The input shaft 12 extends into the carrier frame and rotatably supports it by means of sleeve bearing 32. A collar 34 secured to the input shaft by set screw 36 holds the input shaft in axially assembled relation to the bearing and the carrier frame which is rotatable with the output shaft relative to the input shaft.

With continued reference to FIG. 2, the input shaft 12 is connected by set screw 40 to a spur type sun gear 42 spaced from the end of carrier frame 24 by washer 44. The gear 42 is in constant mesh with a planet gear 46 secured by set screw 48 to shaft 50. The shaft 50 is journaled by sleeve bearing 52 and bearing 54 mounted in the carrier frame to establish a movable rotational axis parallel to the common fixed axis of the input and output shafts. A bevel gear 56 is secured by set screw 58 to one end of shaft 50 remote from gear 46 and is spaced from bearing 54 by washer 60. The shaft 50 and the gears 46 and 56 secured thereto form a compound planet gear sub-assembly held axially assembled in the carrier frame by a collar 62 secured to shaft 50 by set screw 64 and spaced from bearing 54 by washer 66. The gear 42 in mesh with planet gear 46 thus constitutes an input sun gear of a planetary gear assembly so far described.

The carrier frame 24 rotatably mounts intermediate its longitudinal ends a spider assembly generally denoted by reference numeral 68 as more clearly seen in FIGS. 2 and 5. The spider assembly includes axially aligned shaft sections or spindles 70a and 70b respectively journaled by sleeve bearings 74 and 76 in the carrier frame for rotation about a movable spider axis intersecting the fixed common carrier axis of the input and output shafts at right angles. Collars 78 and 80 secured by set screws 82 and 84 to the remote ends of the shaft sections 70a and 70b hold the spider assembly assembled in the carrier frame. The collars are spaced from the carrier frame by thrust washers 86 and 88 as shown in FIG. 2. Two other pairs of axially aligned shaft sections or spindles 72a, 72b and 90a, 90b are included in the spider assembly as more clearly seen in FIG. 5 to establish two rotor axes lying in a common plane, perpendicular to each other and intersecting the spider axis at right angles on a point 92 which lies in the common plane containing the fixed axis about which the carrier frame is rotatable with the output shaft. The spider assembly rotatably supports an eccentric rotor assembly to establish a cyclically varying eccentric mass distribution as hereinafter described.

A bevel gear 94 is secured by set screw 96 to shaft section 70b and is in mesh with bevel gear 56 of the compound planet gear sub-assembly aforementioned as more clearly seen in FIGS. 2 and 3. The bevel gears 56 and 94 thus establish a driving relationship between rotation of the compound planet gear sub-assembly and rotation of the spider assembly about the axis extending through the aligned shaft sections 70a and 70b. Axially spaced reaction bevel gears 100 and 102 are secured by set screws 104 and 106 respectively to the sleeve 74 within which the shaft section 70a is journaled. The bevel gear 102 is fixedly secured to the carrier frame 24 by a screw fastener 98. Thus, the sleeve 74, bevel gear 100 as well as the bevel gear 102 will rotate with the carrier frame about the common fixed rotational axis intersecting the aligned shaft sections 70a and 70b.

The radially inner reaction bevel gear 100 is in mesh with confronting rotor driving bevel gears 108 and 110 secured to sleeves 112 and 114 respectively carried on aligned shaft sections 72a and 72b of the spider assembly 68. A pair of eccentric rotors in the form of semi-circular discs 116 and 118 are secured to the sleeves 112 and 114 respectively in axially spaced relation to the bevel gears 108 and 110. Each rotor disc is accordingly provided with a tubular hub 120 secured to the sleeve 112 or 114 by a set screw 122 as more clearly seen in FIG. 2. The sleeve and rotor disc is held assembled on the shaft section 72a or 72b by a collar 124 secured to the shaft section and spaced from the collar by a spacing washer 126. The semi-circular shape of the rotor disc will establish rotor mass centers in eccentric relation to the aligned shaft sections 72a and 72b. Said mass centers are shown positioned in angular phase with each other on opposite sides of the intersection 92.

The radially outer reaction bevel gear 102 is in mesh with confronting rotor-driving bevel gears 128 and 130 respectively secured to sleeves 132 and 134 rotatably carried on shaft sections 90a and 90b as more clearly seen in FIG. 3. Rotor elements in the form of semi-circular discs 136 and 138 are respectively secured to the sleeves 132 and 134 in axially spaced relation to the bevel gears 128 and 130. Each rotor disc is therefore provided with a tubular hub 140 secured by a set screw 142 to the sleeve 132 or 134 which is held assembled on its shaft section 90a or 90b by a collar 144 and a thrust washer 146. The centers of mass associated with the discs 136 and 138 are positioned in 180° out of phase relation to each other on the aligned shaft section 90a and 90b as shown in FIGS. 1 and 3. The rotor discs 116, 118, 136 and 138 form the aforementioned eccentric rotor assembly.

Operation of the transmission will now become apparent from the foregoing description. Assuming the output shaft 14 is under heavy load, the carrier frame 24 will initially be stationary when torque is applied to the input shaft 12. The gears 42, 46, 56 and 94 will therefore initially transmit drive to the spider assembly 68 at a drive ratio dependent on the product of meshing gear teeth ratios. The spider assembly will rotate about the axis of aligned shaft sections 70a and 70b causing the bevel gears 108 and 110 on shaft sections 72a and 72b to walk around initially stationary bevel gear 100 so as to rotate in opposite directions about the axis of aligned shaft section 72a and 72b because of the perpendicular intersecting relationship between the fixed common axis of the carrier frame and the axis of the aligned shaft sections or spindles. Similarly, bevel gears 128 and 130 on aligned shaft sections 90a and 90b will rotate in opposite directions because of their meshing engagement with initially stationary bevel gear 102 fixed to the carrier frame. The rotational speed of the bevel gears 108, 110, 128 and 130 will be dependent on the gear teeth ratios between said bevel gears on the spider assembly and the bevel gears 100 and 102 fixed to the carrier frame. Assuming each of the meshing bevel gear pairs hereinbefore described have equal numbers of meshing gear teeth, the rotor discs on each pair of aligned spindles will be rotated on their spindles in opposite directions at the same speed relative to the stationary carrier frame while the spider assembly is being initially rotated about aligned spindles 70a and 70b. The rotational speed of the rotor discs relative to the spider and the carrier frame will however vary as the carrier frame begins to rotate and transmit torque to the output shaft. The inertia of the rotor discs 116, 118, 136 and 138 will exert a restraint or reaction to absorb kinetic energy and retard their rotation to thereby initially cause slow rotation of the carrier frame at an initially high overall reduction drive ratio. As the load on the output shaft 14 is overcome or reduced kinetic energy stored by the eccentrically weighted discs 116, 118, 136 and 138 is released to cause an increase in the speed of the discs relative to the spider and thereby increase the rotational speed of the carrier frame corresponding to a decrease in the initially high reduction ratio toward a direct drive ratio or an overdrive ratio.

Since the semi-circular rotor discs of each pair rotate in opposite directions, they will cyclically balance each other in a rotational plane perpendicular to the movable spindle axis to provide a resultant imbalance on each of the two pair of aligned spindles 72a, 72b and 90a, 90b that sinusoidally varies between zero and a maximum for each rotational cycle. For example, FIG. 1 shows the spindle pair 72 in position of maximum unbalance while spindle pair 90 is shown in position of balance or zero imbalance. Further, a 90° out of phase relationship exists as shown in FIG. 1 between the imbalance of the two pair of spindles 72a, 72b and 90a, 90b. It will therefore be apparent that the resultant imbalance of the entire spider assembly 68 will cyclically vary both in magnitude and direction so as to affect the restraint imposed in the compound planet gear sub-assembly as a function of the instantaneous rotational position of the aligned spindles 70a and 70b relative to the carrier frame.

It will now be apparent that the rotating semi-circular discs 116, 118, 136 and 138 absorb and release energy as a function of speed or centrifugal force to control rotation of the bevel gears connected thereto relative to the spider assembly 68 drivingly connected by bevel gears 56 and 94 to the compound planet gear sub-assembly formed by shaft 50 and gear 46. In addition, energy is absorbed and released under control of the positional phase condition established by the rotor discs on the spider assembly relative to the carrier frame because of the intersecting spindle and fixed rotational axis relationship. Torque applied to the input shaft will therefore be split between paths extending to the output shaft and to the rotating discs for drive at reduction drive ratios, while torque originating from the energy stored in the rotating eccentric discs combined with the torque from the input shaft may effect drive at an overdrive ratio depending on the relative input torque, output loading and internal rotor imbalance condition of the transmission.

In the transmission 10 herein before described, a single spider assembly 68 is utilized having two eccentrically loaded spindle pairs 72a, 72b and 90a, 90b establishing perpendicular intersecting rotor axes lying in a common plane intersected at right angles by the spindle pair 70 which rotatably mounts the spider assembly in the carrier frame. A transmission 148 as schematically depicted in FIG. 4 features two separate spider assemblies 150 and 150' each carrying one pair of semi-circular eccentric mass discs. Each spider assembly therefore includes aligned spindles 152a and 152b intersected at point 154 by the aligned pair of spindles 156a and 156b as more clearly seen in FIG. 6. Spindles 152 of spider assemblies 150 and 150' perpendicular to the spindle pair 156, are rotatably mounted in a carrier frame 158 to which output shaft 160 is connected as shown in FIG. 4. The carrier frame is rotatably supported at one end by the bearing 162 for the output shaft and by a bearing 164 at the other end to establish a common fixed rotational axis for the carrier frame and an input shaft 166, said fixed axes lying in the common plane containing rotor axes established by the spindle pair 156. An input sun gear 168 connected to the input shaft meshes with a planet gear 170 rotatably mounted in the carrier frame about an axis parallel to the fixed rotational axis of the carrier frame. The planet gear 170 is connected by shaft 172 to a bevel gear 174 in mesh with bevel gear 176 secured to the spindle 152 of the spider assembly 150. The spindle 152 is journaled in the carrier frame by sleeve 178 to which reaction bevel gear 180 is connected. The bevel gear 180 meshes with a pair of confronting rotor-driving bevel gears 182 and 184 to which eccentric mass discs 186 and 188 are connected by sleeves 190 and 192. The sleeves 190 and 192 are rotatably carried on spindles 156 of the spider assembly.

The bevel gear 176 secured to spindle 152 drivingly connects planet gear shaft 172 to an aligned connecting shaft 194 to which a bevel gear 196 is connected. The bevel gear 196 meshes with bevel gear 198 secured to the spindle 152 of the second spider assembly 150'. This spindle 152 is journaled in the carrier frame by sleeve 200. A bevel gear 202 fixed to the carrier frame meshes with confronting bevel gears 204 and 206 respectively connected by sleeves 208 and 210 to rotor discs 212 and 214.

Except for the distribution of the two pairs of contrarotating eccentric discs between two spider assemblies, the transmission 148 is similar in arrangement and operation to the transmission 10 of FIGS. 1, 2, 3 and 5 as hereinbefore described. However, as shown in FIG. 4, the spindles 152 of each spindle assembly 150 and 150' are rotated in opposite directions relative to the carrier frame 158.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A variable drive ratio transmission, comprising input and output elements, a carrier frame connected to one of said elements for rotation about a fixed axis, a spindle, means mounting the spindle in the carrier frame for rotation about a first movable axis, eccentric rotor means of variable unbalance rotatably mounted on the spindle for rotation about a second movable axis intersecting the first movable axis on said fixed axis, planet gear means drivingly connecting the other of the elements to the spindle for rotation thereof relative to the carrier frame about said first movable axis, and reaction gear means drivingly connecting the carrier frame to the eccentric rotor means for varying the unbalance thereof in response to relative rotation between the carrier frame and said spindle.

2. The combination of claim 1, wherein said eccentric rotor means includes a pair of rotor elements rotatable on the spindle in opposite directions about said second axis to vary imbalance of the spindle between zero and a maximum value.

3. The combination of claim 2, wherein said eccentric rotor means further includes a second pair of rotor elements rotatable on the spindle in opposite directions about a third movable axis intersecting the first and second movable axes on said fixed axis to vary imbalance in out-of-phase relation to the first pair of rotor elements.

4. A variable drive ratio transmission, comprising input and output elements, a carrier frame connected to one of said elements for rotation about a fixed axis, a spindle, means mounting the spindle in the carrier frame for rotation about a first movable axis, eccentric rotor means rotatably mounted on the spindle for rotation about a second movable axis intersecting the first movable axis on said fixed axis, planet gear means drivingly connecting the other of the elements to the spindle for rotation thereof relative to the carrier frame about said first movable axis, and reaction gear means drivingly connecting the carrier frame to the eccentric rotor means for rotation thereof about said second movable axis in response to relative rotation between the carrier frame and said spindle, said reaction gear means including a gear member fixed to the carrier frame, said eccentric rotor means including a pair of rotor elements rotatable on the spindle at the same speed in opposite directions about said second movable axis, said eccentric rotor means further including a second pair of rotor elements rotatable on the spindle in opposite directions about a third movable axis intersecting the first and second movable axes on said fixed axis, said two pair of rotor elements establishing eccentric mass centers that cyclically vary in magnitude and direction and are 90° out of phase with each other.

5. The combination of claim 1 including a second spindle mounted in the carrier frame for rotation about a third movable axis in parallel spaced relation to the first movable axis, said planet gear means being drivingly connected to the second spindle for simultaneous rotation of both of said spindles in opposite directions.

6. The combination of claim 5, wherein said eccentric rotor means includes a pair of rotor elements rotatably mounted on each of said spindles for rotation in opposite directions about said second movable axis and a fourth movable axis, said fourth movable axis intersecting the third movable axis on the fixed axis.

7. A variable drive ratio transmission, comprising a carrier frame, a drive gear, means mounting said carrier frame and drive gear for rotation relative to each other about a fixed carrier axis, eccentric rotor means of varying imbalance mounted in the carrier frame for rotation relative thereto about at least one movable spider axis intersecting the fixed carrier axis, planetary gear means drivingly connecting the drive gear to the eccentric rotor means for rotation thereof about said movable spider axis, and reaction gear means fixed to the carrier frame for cyclically varying the imbalance of the eccentric rotor means relative to the carrier frame in response to rotation about said movable spider axis.

8. The combination of claim 7, wherein said eccentric rotor means includes two rotor assemblies rotatable about separate rotor axes intersecting the fixed axis, said rotor assemblies having imbalance varied in out-of-phase relation to each other.

9. The combination of claim 8, wherein said rotor axes intersect each other at a common intersection with said movable spider axis.

10. The combination of claim 7, wherein said eccentric rotor means is also rotated about a second movable spider axis disposed in parallel spaced relation to said first mentioned movable spider axis.

11. The combination of claim 10, wherein said eccentric rotor means includes two rotor assemblies rotatable about separate rotor axes intersecting the fixed axis, said rotor axes also intersecting the two movable axes respectively on said fixed axis.

* * * * *